US011580032B2

United States Patent
Piry et al.

(10) Patent No.: US 11,580,032 B2
(45) Date of Patent: Feb. 14, 2023

(54) TECHNIQUE FOR TRAINING A PREDICTION APPARATUS

(71) Applicant: Arm Limited, Cambridge (GB)

(72) Inventors: Frederic Claude Marie Piry, Alpes Maritimes (FR); Natalya Bondarenko, Antibes (FR); Cédric Denis Robert Airaud, Saint Laurent du Var (FR); Geoffray Matthieu Lacourba, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/153,147

(22) Filed: Jan. 20, 2021

(65) Prior Publication Data

US 2022/0229783 A1 Jul. 21, 2022

(51) Int. Cl.
*G06F 12/126* (2016.01)
*G06F 12/02* (2006.01)
*G06K 9/62* (2022.01)

(52) U.S. Cl.
CPC .......... *G06F 12/126* (2013.01); *G06F 12/023* (2013.01); *G06K 9/6257* (2013.01)

(58) Field of Classification Search
None
See application file for complete search history.

(56) References Cited

U.S. PATENT DOCUMENTS

| 7,774,578 B2* | 8/2010 | Keltcher | G06F 9/383 711/213 |
| 2013/0238861 A1* | 9/2013 | Manne | G06F 12/0862 711/137 |
| 2016/0054997 A1* | 2/2016 | Radhakrishnan | G06F 12/0862 711/137 |
| 2019/0278870 A1* | 9/2019 | Novielli | G06F 16/9574 |

* cited by examiner

Primary Examiner — William E. Baughman
(74) Attorney, Agent, or Firm — Nixon & Vanderhye P.C.

(57) ABSTRACT

A technique is provided for training a prediction apparatus. The apparatus has an input interface for receiving a sequence of training events indicative of program instructions, and identifier value generation circuitry for performing an identifier value generation function to generate, for a given training event received at the input interface, an identifier value for that given training event. The identifier value generation function is arranged such that the generated identifier value is dependent on at least one register referenced by a program instruction indicated by that given training event. Prediction storage is provided with a plurality of training entries, where each training entry is allocated an identifier value as generated by the identifier value generation function, and is used to maintain training data derived from training events having that allocated identifier value. Matching circuitry is then responsive to the given training event to detect whether the prediction storage has a matching training entry (i.e. an entry whose allocated identifier value matches the identifier value for the given training event). If so, it causes the training data in the matching training entry to be updated in dependence on the given training event.

16 Claims, 14 Drawing Sheets

TRAINING ENTRY (STRIDE-BASED EXAMPLE)

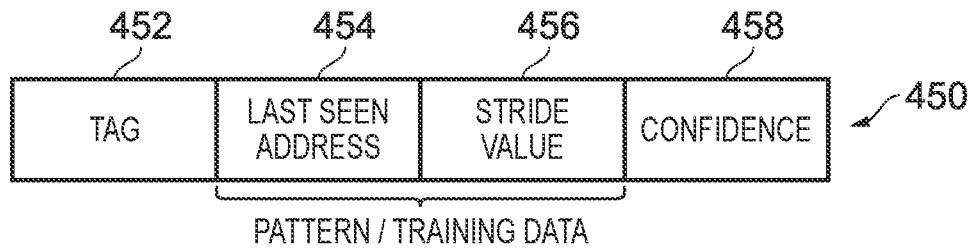

ASSUME ALLOCATE FOR TAG VALUE P, FOR AN INSTRUCTION/ TRAINING EVENT THAT ACCESSES ADDRESS B

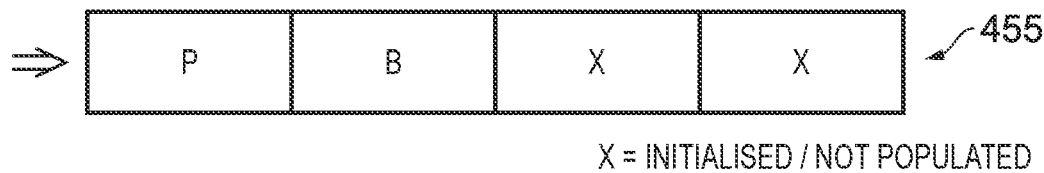

X = INITIALISED / NOT POPULATED

ASSUME NEXT TIME A TRAINING EVENT IS DETECTED WITH TAG VALUE P, THE INSTRUCTION ACCESSES ADDRESS B+1

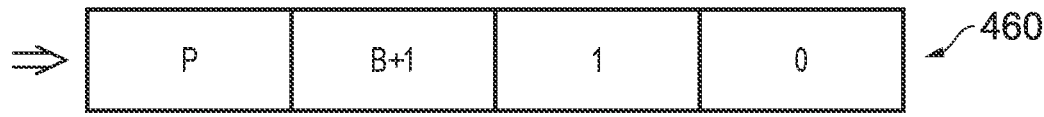

ASSUME NEXT TIME A TRAINING EVENT IS DETECTED WITH TAG VALUE P, THE INSTRUCTION ACCESSES ADDRESS B+2

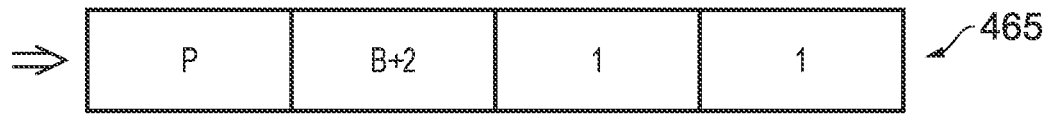

TRAINING ENTRY NOW CONSIDERED TRAINED
NEXT TIME AN EVENT IS DETECTED WITH TAG VALUE P, IF IT ACCESSES ADDRESS B+3

(1) CAN UPDATE ENTRY TO 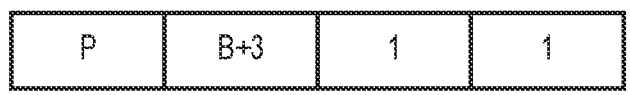

(2) MAKE A PREDICTION TO PREFETCH DATA AT ADDRESS B+4

FIG. 6

INSTRUCTION (Ra, Rb, Rc, Px, Py)

TAG (ID VALUE) = Fn $\left\{\begin{array}{c}\text{AT LEAST ONE OF Ra, Rb, Rc, Px, Py}\\\text{AND OPTIONALLY ONE OR MORE OTHER}\\\text{PARAMETERS}\end{array}\right\}$

```
for (i = 0; i < 1024; ++i)    PC0 set i to 0
{                              loop:
    a[i] = b[i] * c[i];        PC1    load b[i] to r0
}                              PC2    load c[i] to r1
                               PC3    multiply r0 and r1, place result to r0
                               PC4    store r0 to a[i]
                               PC5    increase i by 1
                               PC6    goto loop
```

- Stream of accesses: B, C, A, B+1, C+1, A+1, B+2, C+2, A+2, B+3, C+3, A+3

FIG. 9A

- Loop unrolling case

```
PC0    set i to 0
loop:
PC1        load b[i] to r0
PC2        load c[i] to r1
PC3        multiply r0 and r1, place result to r0
PC4        store r0 to a[i]
PC5        load b[i+1] to r0
PC6        load c[i+1] to r1
PC7        multiply r0 and r1, place result to r0
PC8        store r0 to a[i+1]
PC9        increase i by 2
PC10       goto loop
```

- Stream of accesses: B, C, A, B+1, C+1, A+1, B+2, C+2, A+2, B+3, C+3, A+3, B+4, C+4, A+4, B+5, C+5, A+5, B+6, C+6, A+6

FIG. 9C

TECHNIQUE FOR TRAINING A PREDICTION APPARATUS

BACKGROUND

A technique for training a prediction apparatus is described herein.

Within a data processing system, a number of different types of prediction apparatus may be used. As one example of a prediction apparatus, a prefetch unit can be provided to seek to predict the memory addresses of accesses that may be made to memory, so as to allow the data at those memory addresses to be prefetched into one or more caches in anticipation of that data in due course being accessed. If the predictions made by the prefetch unit are accurate, this can significantly increase performance by improving the hit rate within the cache. As another example of a prediction apparatus, various types of branch prediction units may be provided, for example to make predictions as to whether a branch instruction will be taken or not taken, and/or to predict a target address for a branch instruction in the event that the branch is taken.

Typically, a prediction apparatus will include prediction storage that has a number of entries that can be used to maintain information referred to when making predictions. The information maintained in those entries is derived through training of the prediction apparatus, and hence the prediction apparatus may be provided with a sequence of training events that can be used to populate and adjust the information maintained within the entries of the prediction storage. For any given training event received by the apparatus, the aim is to match that training event with one of the entries in the prediction storage, so that the information (also referred to as training data) maintained in that entry can then be updated based on the given training event. This matching process can be achieved by determining some identifier value based on a received training event, and then seeking to match it with a corresponding identifier value maintained for each of the entries in the prediction storage. However, the way in which those identifier values are determined can significantly impact how well the prediction apparatus is trained, and hence ultimately how accurate the predictions made by the prediction apparatus are.

SUMMARY

In one example arrangement there is provided an apparatus comprising: an input interface to receive a sequence of training events indicative of program instructions; identifier value generation circuitry to perform an identifier value generation function to generate, for a given training event received at the input interface, an identifier value for that given training event, wherein the identifier value generation function is arranged such that the generated identifier value is dependent on at least one register referenced by a program instruction indicated by that given training event; prediction storage having a plurality of training entries, wherein each training entry is allocated an identifier value as generated by the identifier value generation function, and is used to maintain training data derived from training events having that allocated identifier value; and matching circuitry, responsive to the given training event, to detect whether the prediction storage has a matching training entry whose allocated identifier value matches the identifier value for the given training event, and in that event to cause the training data in the matching training entry to be updated in dependence on the given training event.

In another example arrangement there is provided a method of training a prediction apparatus, comprising: receiving a sequence of training events indicative of program instructions; performing an identifier value generation function to generate, for a given training event received, an identifier value for that given training event, wherein the identifier value generation function is arranged such that the generated identifier value is dependent on at least one register referenced by a program instruction indicated by that given training event; maintaining within prediction storage a plurality of training entries, wherein each training entry is allocated an identifier value as generated by the identifier value generation function, and is used to maintain training data derived from training events having that allocated identifier value; and responsive to the given training event, detecting whether the prediction storage has a matching training entry whose allocated identifier value matches the identifier value for the given training event, and in that event to cause the training data in the matching training entry to be updated in dependence on the given training event.

In a yet further example arrangement there is provided an apparatus comprising: input interface means for receiving a sequence of training events indicative of program instructions; identifier value generation means for performing an identifier value generation function to generate, for a given training event received at the input interface means, an identifier value for that given training event, wherein the identifier value generation function is arranged such that the generated identifier value is dependent on at least one register referenced by a program instruction indicated by that given training event; prediction storage means for providing a plurality of training entries, wherein each training entry is allocated an identifier value as generated by the identifier value generation function, and is used to maintain training data derived from training events having that allocated identifier value; and matching means, responsive to the given training event, for detecting whether the prediction storage means has a matching training entry whose allocated identifier value matches the identifier value for the given training event, and in that event to cause the training data in the matching training entry to be updated in dependence on the given training event.

BRIEF DESCRIPTION OF THE DRAWINGS

The present technique will be described further, by way of illustration only, with reference to examples thereof as illustrated in the accompanying drawings, in which:

FIG. 6 schematically illustrates how a training entry within the prediction storage of FIG. 2 may be updated as a result of a series of training events, in accordance with one example implementation;

FIGS. 9A to 9D illustrate known tagging schemes that are based on program counter or address distance.

DESCRIPTION OF EXAMPLES

Figure 1:
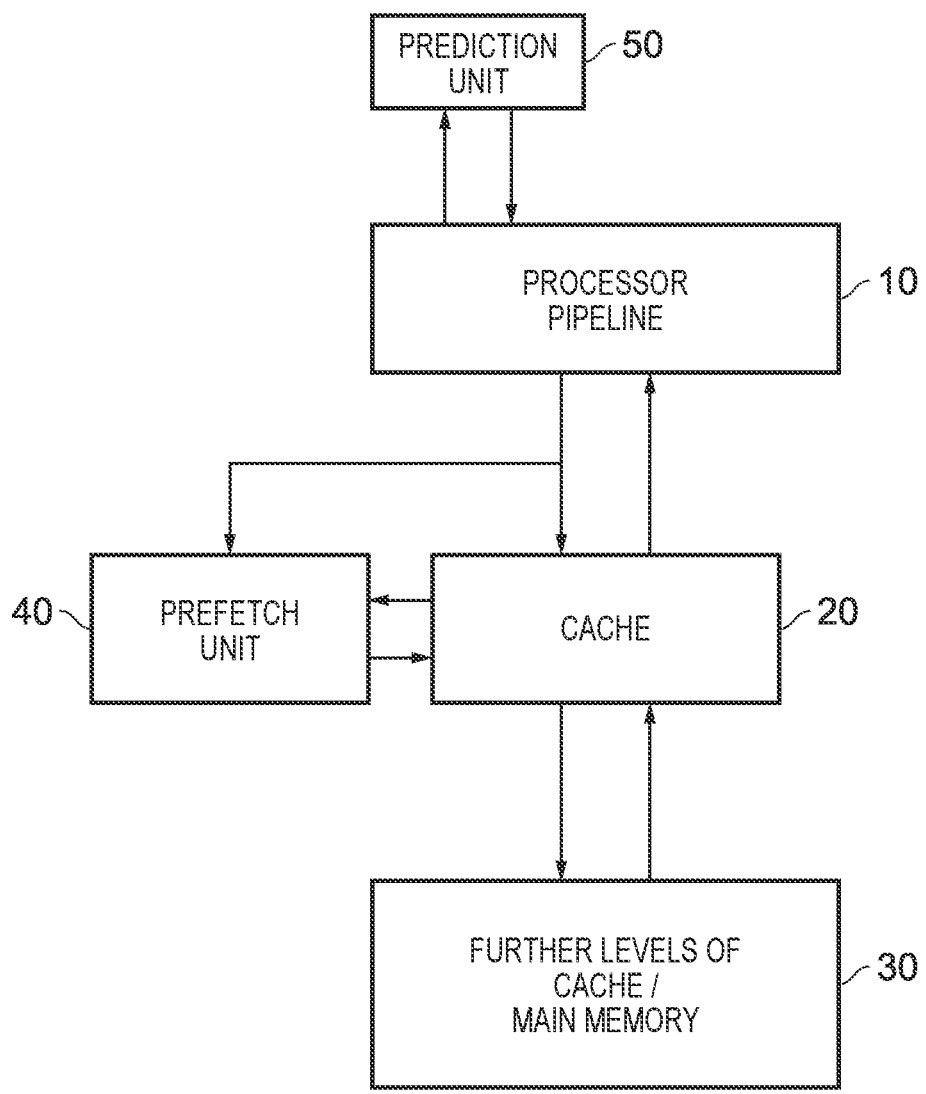
FIG. 1 is a block diagram of a system in accordance with one example implementation.

As discussed earlier, the manner in which identifier values are generated for each training event within a sequence of training events received by a prediction apparatus, in order to allow individual training events to be matched to particular entries in the prediction storage, can significantly affect how well the entries in the prediction storage are trained, and accordingly how performant the prediction apparatus ultimately proves to be. The logic used to derive identifier values for each training event, and to determine for which identifier values to maintain entries in the prediction storage, is hence a key element within a prediction apparatus, since this logic must decide for each incoming training event exactly which part of the training that training event belongs to.

A number of techniques are known for generating identifier values. For example, when each training event relates to a program instruction, the program counter value for that program instruction can be used as the identifier value. Hence, considering the situation where a sequence of code is repetitively executed over multiple loops, it can be seen that each time the program instruction at a particular program counter value is observed, information pertaining to that instance of the program instruction can be used to update the training data maintained within a training entry that is also tagged using that program counter value. Whilst this approach can work well in many situations, it can be problematic in some instances, for example when the originally formulated code has been subject to loop unrolling. In such cases, a particular instruction of interest may actually be present at multiple different program counter values, and this can lead to multiple entries being made within the prediction storage. This can lead to both inefficient use of the prediction storage, but also can impact effective training and subsequent use of any particular entry within the prediction storage. Furthermore, the number of entries available within the prediction storage may be quite limited, and hence the creation and tracking of multiple entries for what is, in effect, logically the same stream can lead to thrashing within the prediction storage, with entries being discarded and new entries allocated on a regular basis, in the worst case without multiple of those entries ever being trained to the point at which they can effectively be used to make subsequent predictions.

Another known scheme for creating the identifier values for training events is based on address distance. In particular, considering the example of a prediction apparatus in the form of a prefetch unit, this may seek to monitor memory accesses in order to seek to detect patterns and hence be able to make predictions about future accesses that may be required. In accordance with one known technique, an address distance scheme can be used, where different entries in the prediction storage are maintained for different address ranges, and hence any particular given training event is matched with a training entry based on the memory address being accessed by the program instruction indicated by that training event. Whilst such a scheme can be more tolerant to loop unrolling, it is usually less stable than a scheme based on program counter matching, and also its effectiveness is highly dependent on how the address ranges to be associated with the individual training entries in the prediction storage are chosen.

Accordingly, it would be desirable to provide an improved mechanism for training a prediction apparatus.

In accordance with the techniques described herein, an apparatus is provided that has an input interface for receiving a sequence of training events indicative of the program instructions. The apparatus further has identifier value generation circuitry that is arranged to perform an identifier value generation function to generate, for a given training event received at the input interface, an identifier value for that given training event. In accordance with the techniques described herein, the identifier value generation function is arranged such that the generated identifier value is dependent on at least one register referenced by a program instruction indicated by that given training event.

Prediction storage is provided within the apparatus, and has a plurality of training entries, where each training entry is allocated an identifier value as generated by the identifier value generation function, and each training entry is used to maintain training data derived from training events having that allocated identifier value. Matching circuitry is responsive to the given training event to detect whether the prediction storage has a matching training entry whose allocated identifier value matches the identifier value for the given training event. If that is the case, it then causes the training data in the matching training entry to be updated in dependence on the given training event.

It has been observed that there are many practical implementations where the training events of interest when seeking to detect a particular pattern are those that relate to program instructions that access at least some registers in common. Hence, by basing the generated identifier value on at least one register referenced by a program instruction indicated by a training event, it has been found that this can significantly improve the training process, by making more efficient use of the available entries within the prediction storage, and by more accurately mapping individual training events to the relevant training entry within the prediction storage. This can hence yield improved stability in the training process, and improve the overall performance of the prediction apparatus as a result.

Considering the earlier-mentioned known techniques, the above approach where the identifier value is dependent on at least one register referenced by a program instruction indicated by a training event can produce many of the stability benefits of a program counter based mechanism, whilst being much more tolerant to loop unrolling. In particular, in contrast to a scheme based solely on program counter values, the above described technique can avoid, or significantly reduce, the creation of multiple entries within the prediction storage for what is effectively the same instruction of interest. Furthermore, it has been found that the above approach that makes reference to at least one register referenced by a program instruction indicated by a given training event can produce a much more stable training than a scheme based on the earlier-mentioned address distance mechanism.

As mentioned earlier, the sequence of training events are indicative of program instructions. It should be noted that the training mechanism can be implemented in a variety of ways, and as a result the training events may be generated ahead of actual execution of program instructions, or alternatively may be generated during the actual execution, or following the actual execution, of the associated program instructions. Hence, the training events may relate to instructions actually being executed, or having completed execution, by a processor, or instead may relate to instructions that are intended to be later executed by the processor. In one particular example use case, the training mechanism is coupled to the commit unit in a data processing apparatus, so that the training events relate to observed instructions that have finished their execution. Such an approach can for example be used if it is desired to achieve strict program order of training events, for instance in a large out-of-order CPU (central processing unit).

In one example implementation, the apparatus further comprises prediction circuitry, responsive to a determination that the training data within a given training entry satisfies a prediction generation condition, to treat the given training entry as a trained entry and to use the training data in that trained entry to generate prediction data. The prediction generation condition can take a variety of forms, dependent on the type of prediction apparatus in question. For instance, in some instances each training entry may have a confidence indication provided in association therewith, and the prediction generation condition is determined to have been met once that confidence indication has reached a certain threshold indicating a perceived reliability in the training data maintained within the training entry. However, in other implementations such a confidence indication may not be used, and alternative mechanisms may be used to determine whether the prediction generation condition is present. Purely by way of specific example, certain prefetch units may use a record and replay mechanism where an entry is considered to be trained and available to be used for making predictions as soon as a repetition is observed within a pattern being monitored within the entry of the prediction storage.

In one example implementation the prediction circuitry is arranged, responsive to a generation trigger event identifying at least one register, to perform the identifier value generation function in order to generate the identifier value for that generation trigger event. Then, the prediction circuitry is used to detect whether the prediction storage has a matching trained entry whose allocated identifier value matches the identifier value for the generation trigger event. If so, the prediction circuitry can then be arranged to generate one or more items of prediction data in dependence on the training data in the matching trained entry.

The generation trigger event can take a variety of forms. An example of a generation trigger event may be a demand event resulting from the processing activities performed by an associated processing circuit. For example, considering the situation where the prediction apparatus is a prefetch unit, such a demand event may be a memory access request issued by the processing circuit during program execution, that access request for example being output to an associated cache. However, the generation trigger events do not need to be demand events, and other events may also trigger the generation of predictions. For example, if the prediction apparatus is a prefetch unit associated with a level two cache, then it may be responsive to requests issued by a level one cache, which themselves may be dependent on both demand accesses from the processing circuitry as well as any prefetch requests generated by a level one prefetch unit. Such level one prefetch requests may also output register information, for example by inheriting the register information that was present in the trigger events causing those level one prefetch requests to be generated.

With regard to the generation of the items of prediction data, it should be noted that there will not necessarily be a 1:1 correspondence between a generation trigger event and an item of prediction data. For example, one generation trigger event may cause multiple items of prediction data to be generated. For instance, one trigger event could result in the generation of prediction data relating to multiple cache lines, for example to seek to compensate for any fetch/allocation latency. As another example a generation trigger event could cause prediction data to be generated in order to request one cache line of data to be prefetched into a cache at one level, and also for a cache line of data to be prefetched into one or more additional levels of cache. Further, the exact timing at which the prediction data is issued relative to the timing of receipt of a particular trigger event can vary. For example, if the relevant arbitration queues are full, then the prediction data may not be generated immediately upon receipt of a generation trigger event, but instead the generation of such prediction data will resume when the relevant arbitration queue has space for a new prefetch request.

The identifier value generation function can take a variety of forms. In one particular example implementation, the identifier value generation function is a function using as input solely one or more register identifiers. However, if desired, the identifier value generation function may not be solely based on one or more register identifiers, but could in addition include at least one further input parameter. As an example of the at least one further input parameter, this may be a program counter parameter derived from a program counter value of the associated program instruction. As another example of such a further input parameter, this may comprise a memory address parameter indicative of a memory address to be accessed when executing the associated program instruction. Hence, if desired, the techniques described herein that make use of register identifier information when generating the identifier value can be combined with one or more existing schemes, such as the earlier discussed schemes based on program counter values or address distance.

In one example implementation, the identifier value generation function is a function that uses, as input, register identifiers of multiple registers used by the associated program instruction. In situations where multiple registers are used in this way, the identifier value generation function can be arranged to perform a logical combination of the register identifiers when generating the identifier value. Any suitable logical combination can be used, and by way of specific examples an XOR function could be used or an XOR-shift function could be used.

When adopting an XOR-shift function, various approaches can be taken. For example, the overall number of bits forming the generated identifier value may increase as necessary to take account of the shifted register identifier inputs, or alternatively an increase in the overall number of bits forming the identifier value can be avoided by returning bits shifted out from one end of an input value back into the other end of that input value. As another alternative it may be that not all of the register identifiers used as inputs have the same number of bits, and the inputs subjected to the larger shifting amounts can be chosen to be the register identifiers having the smaller number of bits, thus limiting or avoiding increase in the number of bits forming the resultant identifier value.

In one example implementation, the identifier value generation function is a function using as input one or more register identifiers of predicate registers used by the associated program instruction. It has been found that in many instances the instructions of interest for detecting a particular pattern all make use of the same predicate registers, even in instances where they do not necessarily use the same general purpose registers, and hence in those instances making use of the predicate registers when generating the identifier value can be particularly beneficial for achieving accurate training and efficient use of the prediction storage resources.

In one example implementation, the identifier value generation function is a function using as input the register identifiers of multiple predicate registers, and is arranged to generate the identifier value by concatenating together identifying information of each predicate register. It has been found that there are a number of example implementations where individual instructions may specify multiple predicate registers, and in those instances it can be useful to use information from those multiple predicate registers when generating the identifier value. As a particular example use case, matrix multiplication techniques may provide instructions that specify multiple predicate registers. For example, when considering a two dimensional array of values, one predicate register may be associated with one dimension whilst the other predicate register is associated with the other dimension. Within such matrix multiplication, loop unrolling may be performed in order to gain parallelisation, and hence improve system performance, and it has been found that the same instruction provided at multiple different program counter values (as a result of the loop unrolling) may use the same predicate registers, for example because the same masks are used for all of the iterations. In such cases, basing the identifier value on the predicate registers used can provide a particularly accurate mechanism for training the prediction apparatus by maintaining appropriate training entries, and accurately correlating individual received training events to the relevant entries within the prediction storage.

In one example implementation, the identifier value generation function is a function using as input one or more architectural register identifiers specified by the associated program instructions. Hence, in such an implementation, the register identifier information used is that present in the original program instructions, and hence prior to any register renaming that might subsequently be implemented within the system. However, in an alternative implementation the identifier value generation function may make use of physical register identifiers instead of architectural register identifiers if desired.

As mentioned earlier, the prediction apparatus can take a variety of forms. However, in one example implementation the prediction apparatus is a prefetch unit. In such an implementation, the training events in the sequence may be indicative of memory access program instructions used to access data in memory. The apparatus may then further comprise cache storage to cache a subset of the data stored in the memory, and the prediction circuitry may comprise prefetch circuitry that is used to generate, as the prediction data, an indication of one or more predicted memory addresses predicted to be accessed in future by processing circuitry that is executing the memory access program instructions. By such an approach, this enables the data at those one or more predicted memory addresses to be prefetched into the cache storage in anticipation of them subsequently being the subject of accesses issued by the processing circuitry.

The training data maintained within the training entries can take a variety of forms, but in one example implementation comprise an indication of a pattern derived from previous occurrences of training events having the allocated identifier value for that training entry, and the prediction circuitry is arranged to determine the prediction data from the pattern identified in the training entry.

Each training entry can have certain additional information if desired. For example, each training entry may have a generation condition field whose value is used to identify whether the prediction generation condition is satisfied. The generation condition field can take a variety of forms, but by way of example, in situations where a confidence based scheme is used, the generation condition field can be used to maintain a confidence value, and the prediction generation condition may be determined to have been satisfied once that confidence value reaches a reliability threshold. In other instances, the generation condition field may be a more simple flag, such as in a record and replay type scheme where no confidence is separately maintained, and the training entry is considered to have been trained as soon as a repetition is observed within the pattern being monitored by that training entry.

In one example implementation the apparatus further comprises allocation circuitry, responsive to the matching circuitry determining that the prediction storage has no matching training entry for the given training event, to apply determined criteria to determine whether to allocate one of the training entries to maintain training data for the identifier value of that given training event. The determined criteria that is applied by the allocation circuitry in order to determine when to allocate training entries to maintain training data can take a variety of different forms, and any suitable known allocation policy can be used. Whilst a simple allocation policy may seek to always allocate, and accordingly whenever a new identifier value is generated from a training event, such a policy will seek to allocate an entry for that identifier value, other replacement policies can take a smarter approach, applying various schemes to seek to determine whether the new input is more important than existing information maintained within the prediction circuitry, and in particular whether there is a victim entry whose maintained training data is considered less important than training data from the new input would be. When using such allocation policies, mechanisms such as inactivity counters can be maintained for the entries, so that if an entry is not used for a certain period of time it can be marked as inactive, and hence effectively become a preferred entry for use when allocating a new training entry. Other schemes may implement a "second chance" policy, where if it is decided to drop a new training input rather than allocating it to a victim entry, the victim entry is marked in such a way that if it is subsequently chosen again as a victim entry, it will be replaced next time. Typically replacement policies try to allocate to invalid entries first, and only if there are no invalid entries is a decision made as to whether to replace an active entry with an entry for the new input training event.

Particular examples will now be described with reference to the figures.

FIG. 1 is a block diagram of a data processing system in accordance with one example implementation. A processor pipeline 10 is arranged to execute a sequence of instructions fetched from memory. During the execution of those instructions, various data processing operations will be performed on data that may also be stored in memory. As shown in FIG. 1, the memory system can include one or more levels of cache, and for the sake of illustration a cache 20 is shown that is coupled to the processor pipeline 10, and there may be one or more further levels of cache between that cache and main memory. For ease of illustration in FIG. 1, the further levels of cache and main memory are denoted by the box 30.

A prefetch unit 40 is shown in association with the cache 20 that is arranged to monitor memory accesses issued by the processor pipeline to the cache 20 in order to seek to detect patterns in those accesses. Based on detected patterns, the prefetch unit 40 can then issue prefetch requests to the cache 20, to cause cache lines of data to be retrieved from the further levels of cache/main memory 30 for storage in the cache 20, in anticipation of a future access request being issued by the processor pipeline 10 for that data. Control circuitry within the cache 20 can process both the access requests received by the processor pipeline and the prefetch requests received from the prefetch unit 40, with typically priority being given to the access requests made by the processor pipeline over the prefetch requests made by the prefetch unit.

Whilst a single prefetch unit 40 is shown in FIG. 1, in association with the cache 20, in other implementations one or more additional prefetch units may be provided in association with further levels of cache. For example, if the cache 20 is a level one cache, and is coupled to a level two cache that is closer to main memory than the level one cache 20, a prefetch unit may also be provided in association with the level two cache. It may also seek to detect patterns of accesses, and on detection of such patterns can then be used to predict future accesses that may be made from the level one cache to the level two cache, and in particular to seek to prefetch data into the level two cache in anticipation of that data being requested by the level one cache. Such a level two prefetch unit can monitor the access requests output from the level one cache 20 to the level two cache, which will typically be a combination of the access requests issued by the processor pipeline, for example those that miss within the level one cache 20, and prefetch requests issued from the level one cache as a result of the activities of the prefetch unit 40.

Prefetch units such as the prefetch unit 40 are examples of prediction units that may be provided within a system, but it will be appreciated that other prediction units may also be provided elsewhere within the system. For example, as shown in FIG. 1, a prediction unit 50 may be provided in association with the processor pipeline 10, for example to make predictions in respect of branch instructions. In particular, the processor pipeline will seek to continually fetch a stream of instructions to be executed by later stages within the pipeline, and when a branch instruction is encountered within the fetched instructions, the subsequent instructions that will need executing will be dependent on whether a branch is taken when that branch instruction is subsequently executed. A branch prediction unit can be used to make predictions as to the taken or not taken direction of a branch instruction, based for example on the monitoring of previous branch direction behaviour. In addition, such a branch prediction unit may include components that predict the target address (i.e. the address of the next instruction to be executed) in the event that a branch is taken when a branch instruction is executed.

These various types of prediction unit typically include prediction storage that has a plurality of entries, where each entry is used to maintain data that can be used to make subsequent predictions. For the purposes of the following discussion, a prediction unit in the form of a prefetch unit will be considered, but it will be appreciated that the techniques described herein may equally be applied to other types of prediction unit within the system, for example in relation to a branch prediction unit 50 shown in FIG. 1.

Figure 2:
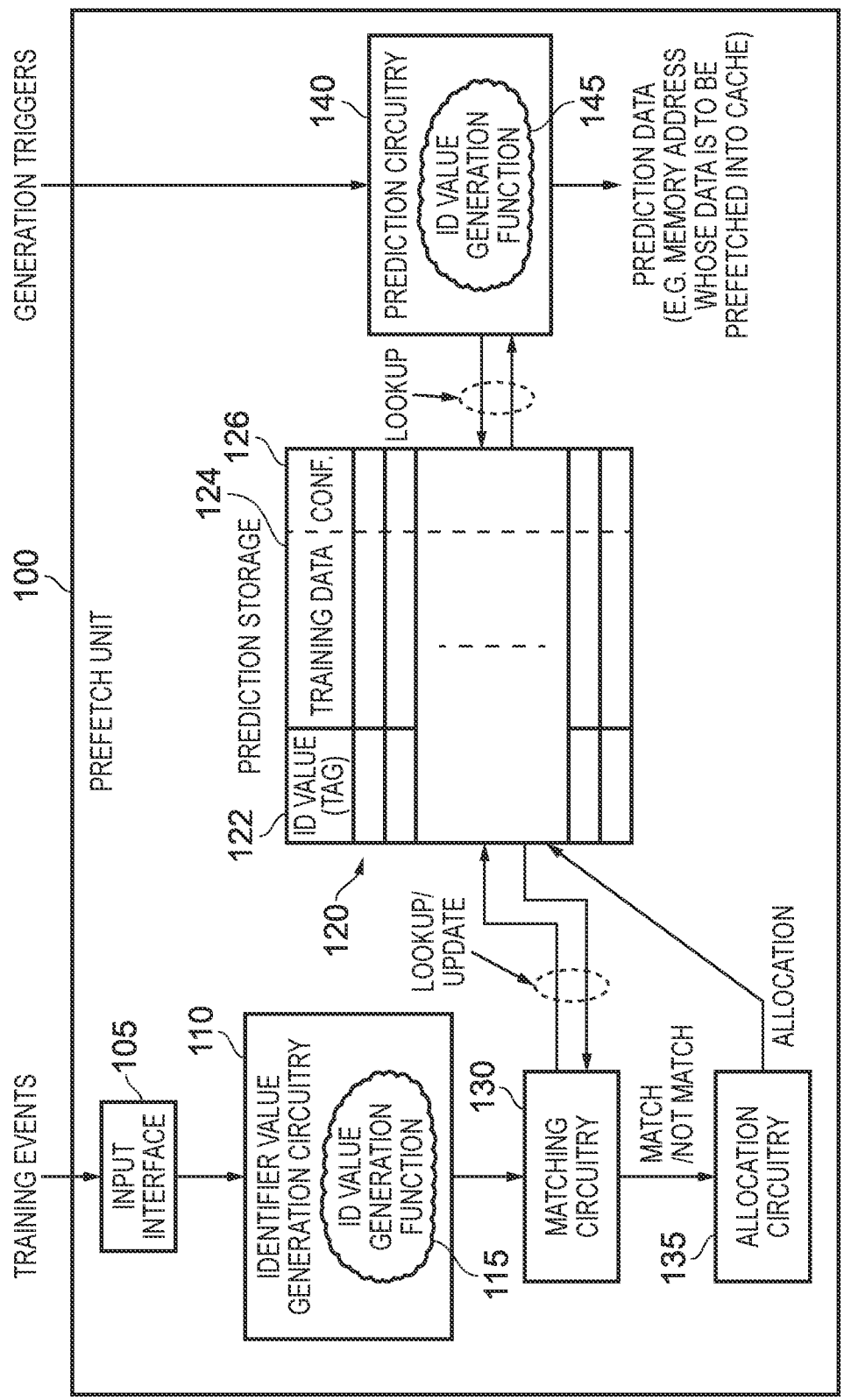
FIG. 2 is a block diagram of a prefetch unit in accordance with one example implementation.

FIG. 2 is a block diagram illustrating components that may be provided within a prefetch unit 100, but similar components may also be provided within other prediction units within the system. As shown in FIG. 2, a sequence of training events are received at an input interface 105, and each received training event is passed to an identifier value generation circuit 110. The identifier value generation circuit is arranged to perform an identifier (ID) value generation function 115 in order to generate, from one or more parameters specified by a received training event, an identifier value for that training event, such an identifier value also being referred to herein as a tag value. The generated ID value is then output to matching circuitry 130 which seeks to match the training event with one of the training entries within prediction storage 120 maintained within the prefetch unit 100.

In particular, as shown in FIG. 2, the prediction storage may comprise multiple entries, where each entry is allocated an ID value within field 122, and is arranged to maintain associated training data 124. Additional ancillary information may be provided, either separately or as part of the training data 124, and by way of example a confidence value 126 may in some example implementations be provided to indicate the level of confidence in the training data 124. Once the training data satisfies a prediction generation condition (for example because a threshold level of confidence has been reached in the training data), then the associated training entry may be viewed as being a trained entry whose training data can then be used subsequently for the purposes of generating prediction data.

When the matching circuitry 130 receives an ID value from the identifier value generation circuitry 110 in respect of a currently received training event, then it performs a lookup within the prediction storage 122 to see if the ID value matches the ID value allocated to any of the entries within the prediction storage 120. If so, then the training data 124 in the matching training entry can be updated in dependence on the given training event. Hence, it will be appreciated that as a series of training events are received that all have an ID value that matches with a specific training entry, then the training data within that training entry can be built up taking into account the various training events, and when a prediction generation condition is satisfied in respect of that training data then that training data can be used subsequently to make predictions. Whilst in the example shown in FIG. 2 a confidence indication 126 is maintained in order to assess when the prediction generation condition is satisfied, in other implementations there may be no need for a confidence indication to be separately maintained, and different criteria may be used to determine when a training entry can be viewed as being sufficiently trained to enable the training data held therein to be used to make predictions.

If no matching entry is detected by the matching circuitry 130 based on the ID value generated for a currently received training event, then the indication that there has not been a match may be forwarded to the allocation circuitry 135, which may then apply various criteria in order to assess whether to allocate an entry within the prediction storage 120 for the ID value of the currently received training event. Any suitable allocation scheme may be used for this purpose. For example, in a simple scheme the allocation circuitry may always seek to allocate an entry for a ID value associated with a newly received training event, in situations where no current training entry within the prediction storage is associated with that ID value. In such situations, a victim entry is selected, whose current contents are discarded, in order to allow that victim entry to then be allocated for the new ID value. However, in other implementations further analysis may be performed in order to determine whether to allocate an entry for the ID value of the currently received training event or not. Various information may be used in this decision making process. For example, in some example implementations an inactivity flag may be maintained in association with each entry, so that when an entry has not been used for a period of time it is marked as inactive, and the allocation circuitry may choose to allocate a new entry if there is a currently existing inactive entry within the prediction storage. Alternatively, some criteria may be assessed in order to determine whether it is considered more useful to allocate an entry for the ID value of the newly received training event rather than maintaining the information in one of the existing entries.

As shown in FIG. 2, the prefetch unit 100 also includes prediction circuitry 140 that receives generation triggers, and in dependence on those generation triggers performs lookups within the prediction storage 120 in order to generate prediction data. The generation triggers can take a variety of forms, depending for example on where the prefetch unit 100 is located within the system. In one example implementation, the training events and the generation triggers may be the same thing, and hence the training stream of events is used to perform both training and generation of prediction. Such an approach might for example be used where the demand stream of access requests from the processor pipeline is used as the training stream, and in addition those demand accesses can be forwarded to the prediction circuitry to seek to make predictions of future accesses anticipated by the processor pipeline. However, in an alternative implementation there may be an entirely separate stream of events that are used for triggering generation of predictions. For instance, it may be the case in some example systems that the prefetch unit is trained based on all accesses, but is arranged to only generate predictions for those accesses that miss within a cache. As another example scenario, if the prefetch unit is used in association with a lower level cache such as a level two cache, then the generation triggers may be derived from the output from the level one cache, which as mentioned earlier could be a combination of both demand accesses that have missed in the level one cache, and level one prefetch requests that are seeking to prefetch data into the level one cache.

As shown in FIG. 2, when a generation trigger is received by the prediction circuitry 140, it employs an ID value generation function 145 that is equivalent to the ID generation function 115 employed within the identifier value generation circuitry 110, and accordingly generates an ID value based on the same combination of parameters as was used for the incoming training events. Based on the generated ID value, a lookup is performed within the prediction storage 120 to see if there are any matching entries, i.e. whether there is an entry that has also been allocated the same ID value. If so, then it can be determined whether than entry is considered to have been trained, and hence whether the training data 124 in that entry is in a form where it can be used to make predictions. If so, then the prediction circuitry can generate one or more items of prediction data. In the context of a prefetch unit, this may take the form of one or more prefetch requests identifying one or more cache lines of data to be prefetched from memory into one or more caches.

It should be noted that there is not necessarily a 1:1 correspondence between a generation trigger and an item of prediction data. For example, one generation trigger could potentially cause multiple items of prediction data to be generated, for example identifying multiple cache line's worth of data to be prefetched into a cache. This can be useful in some situations, for example to compensate for any fetch and/or allocation latency. In addition, the prediction data can target different caches within the system, and hence for example, based on a generation trigger, the prediction circuitry 140 may output a prefetch request for a cache line's worth of data to be prefetched into a level one cache, but may also output one or more additional prefetch requests associated with other levels of cache, seeking to prefetch data into those other levels of cache.

It should also be noted that the timing at which the items of prediction data are generated may be staggered relative to the time at which the associated generation trigger is analysed. For example, it may be that at the time the generation trigger is analysed, and a lookup performed within the prediction storage, the relevant arbitration queue or queues within an associated cache are full, so that at that time a new prefetch request cannot be accommodated. The prediction circuitry can in such instances buffer the information so that when the arbitration queue is available one or more prefetch requests (i.e. one or more items of prediction data) are at that point issued to the relevant cache.

In accordance with the techniques described herein, the ID value generation function 115 is adapted so that it takes into account at least one register referenced by a program instruction indicated by a training event (and similarly the ID value generation function 145 within the prediction circuitry 140 uses the same ID generation function and hence also takes into account at least one register indicated by a received generation trigger). It has been found that such an approach can enable more efficient use of the resources of the prediction storage 120 to be achieved in some situations, and can also lead to a more accurate training of the various entries that are maintained, this resulting in due course in more accurate predictions and hence a more performant prefetch unit 100.

As mentioned earlier, known ID value generation schemes may use information such as a program counter value to seek to maintain within the prediction storage training data for different program counter values, with the aim of seeking to detect patterns associated with access instructions having those particular program counter values. Whilst this can work well in some situations, as mentioned earlier it can cause issues when the originally formulated code is subjected to techniques such as loop unrolling, which can be used to seek to improve performance, for example by taking advantage of parallelisation that may be available within the processor pipeline. However, it will be appreciated that when loop unrolling is performed, then certain access instructions that would originally have been considered to have the same program counter value actually appear with different program counter values, and this can lead to multiple entries being allocated within the prediction storage 120. This can cause problems such as thrashing in some instances, where the training data in certain entries is regularly discarded to make way for allocation of new entries. It can also reduce the accuracy of the training data maintained with any individual entry, particularly as the level of loop unrolling increases and hence more and more entries are potentially allocated for what is logically the same stream of accesses.

As also mentioned earlier, in order to seek to provide a scheme that is more resilient to loop unrolling, a mechanism based on address distance can be used. Such an approach seeks to identify address ranges that can be used to quantify the ID values, so that for any particular training event, an ID value can then be determined based on the memory address being accessed, and that memory address can then be checked by the matching circuitry to see if it falls within any of the address ranges maintained for the individual training entries. Whilst this can be more resilient to loop unrolling, it can be problematic seeking to identify the appropriate address ranges to use for individual entries, and can often lead to a less stable training of the entries within the prediction storage.

However, it has been found that by adopting the scheme described herein, where the identifier value generation function is arranged such that the generated identifier value is dependent on at least one register referenced by a program instruction indicated by the training event, this can lead to a stable training of the entries in the prediction storage, resulting in more optimum use of the prediction storage resources, more accurate training, and as a result a more performant prefetch unit.

Figure 3:
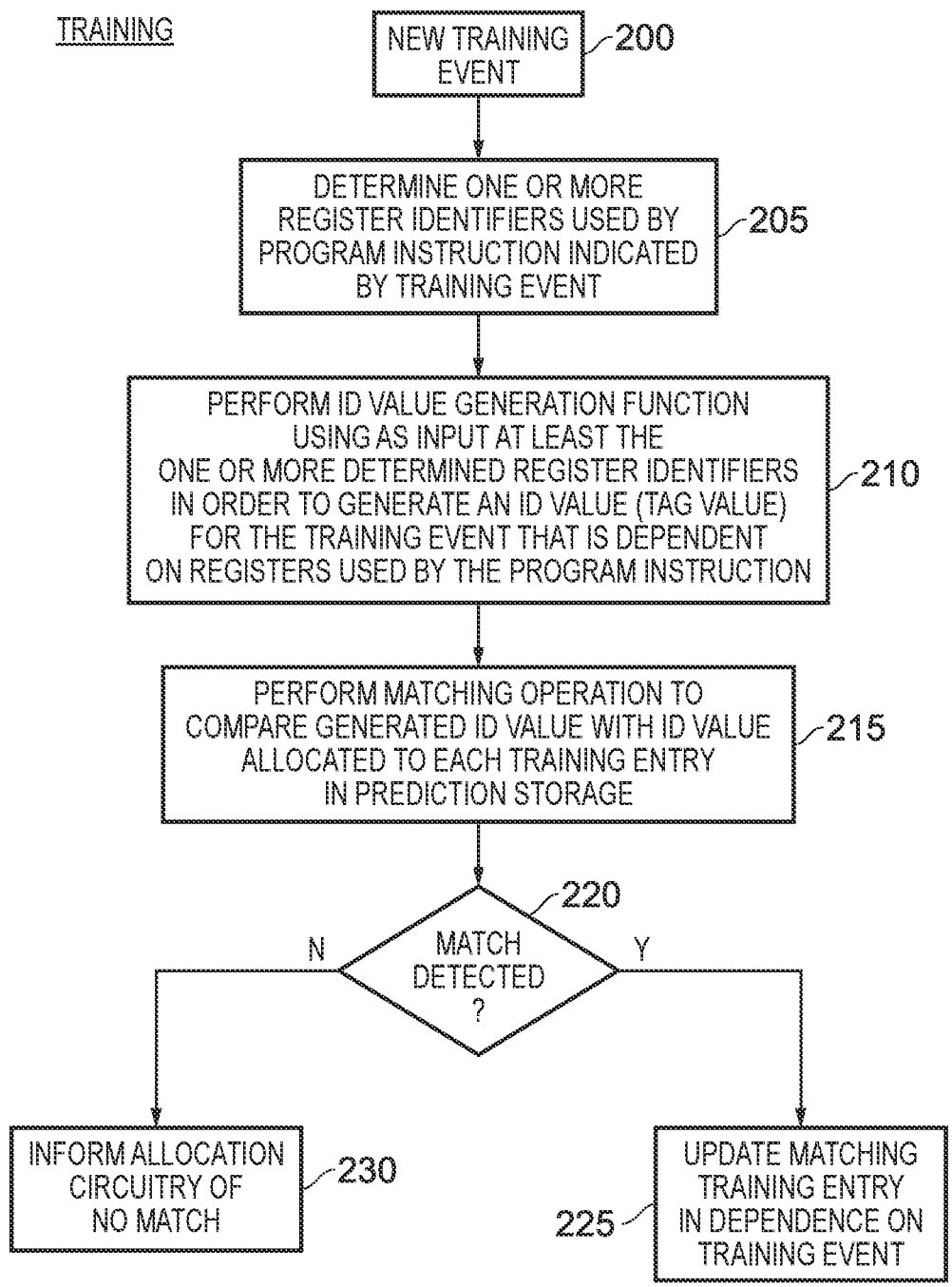
FIG. 3 is a flow diagram illustrating steps undertaken during training of the prefetch unit, in accordance with one example implementation.

FIG. 3 is a flow diagram illustrating the training process performed within the apparatus of FIG. 2 in one example implementation. At step 200, a new training event is received at the interface 105, whereafter at step 205 one or more register identifiers used by the program instruction indicated by the training event is determined. In one example implementation, this determination may be made by the identifier value generation circuitry 110 based on the information about the new training event forwarded from the input interface 105.

At step 210, an ID value generation function is performed using as input at least the one or more determined register identifiers. In some implementations, the ID value generation function may operate solely using the one or more determined register identifiers, but alternatively this register identifier information could also be logically combined with other information, for example PC value or memory address being accessed. As a result of the ID value generation function, an ID value is then generated for the training event that will be dependent on one or more of the registers that have been specified by the program instruction.

At step 215, a matching operation is performed by the matching circuitry 130 to compare the generated ID value with the ID value allocated to each training entry in the prediction storage. In one example implementation, the matching operation is performed in respect of every training entry that is currently valid, and accordingly has an allocated ID value stored therein. In implementations where an activity flag is associated with each entry, to distinguish between active entries and inactive entries, then typically the matching operation will be performed in respect of both the active and the inactive entries, and hence inactive entries can still be subjected to training. Indeed, typically if a match is detected with an inactive entry, that entry will be marked as being active again.

At step 220, it is determined whether a match is detected, and if so the process proceeds to step 225 where the matching training entry is then updated in dependence on the training event. However, in the absence of a match being detected, then at step 230 the allocation circuitry is informed of the absence of a match, and will thereafter apply determined criteria to determine whether an entry within the prediction storage should be allocated for the ID value of the new training event.

Figure 4:
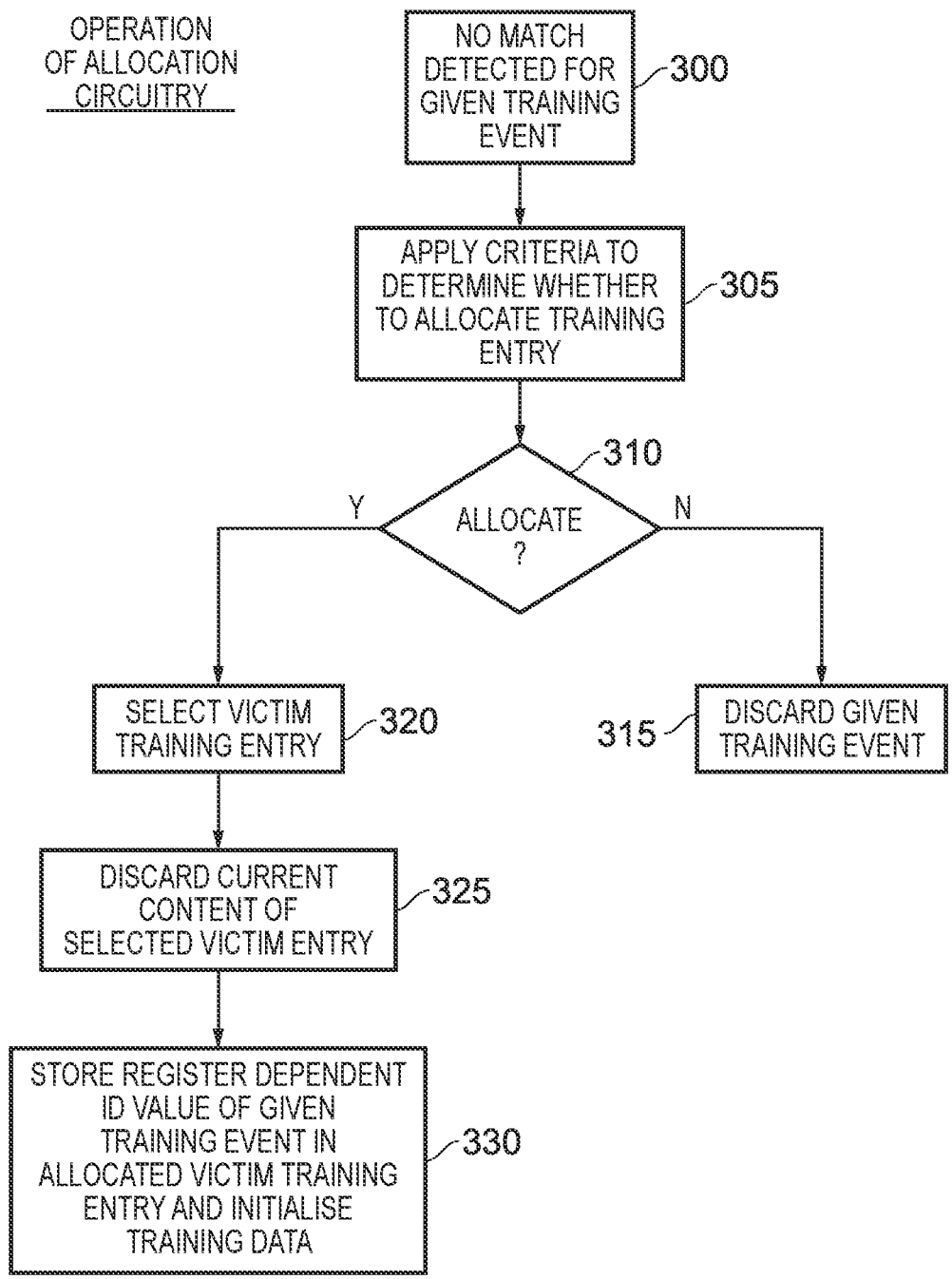
FIG. 4 is a flow diagram illustrating the operation of the allocation circuitry of FIG. 2 in accordance with one example implementation.

FIG. 4 is a flow diagram illustrating the operation of the allocation circuitry 135 of FIG. 2 in accordance with one example implementation. At step 300, the allocation circuitry is advised that no match has been detected for a given training event, and then at step 305 applies criteria to determine whether to allocate a training entry or not. The various criteria that could be applied has been discussed earlier, but in general terms any suitable allocation scheme can be used. At step 310, it is determined whether the application of that criteria has resulted in a decision being made to allocate an entry or not. If not, then the given training event is discarded at step 315. However, if it is determined that an allocation should be made, a victim training entry is selected at step 320. Any suitable victim selection policy may be adopted here, but by way of example any currently invalid entries may be selected as victim entries over any valid entries. Further, if an activity flag is associated with each entry, then it will typically be the case that the victim selection policy will select inactive entries over active entries.

Once the victim training entry has been selected, then at step 325 the current content of that selected victim entry is discarded, and then at step 330 the register dependent ID value of the given training event is stored in the allocated victim training entry and the training data stored therein is initialised.

Figure 5:
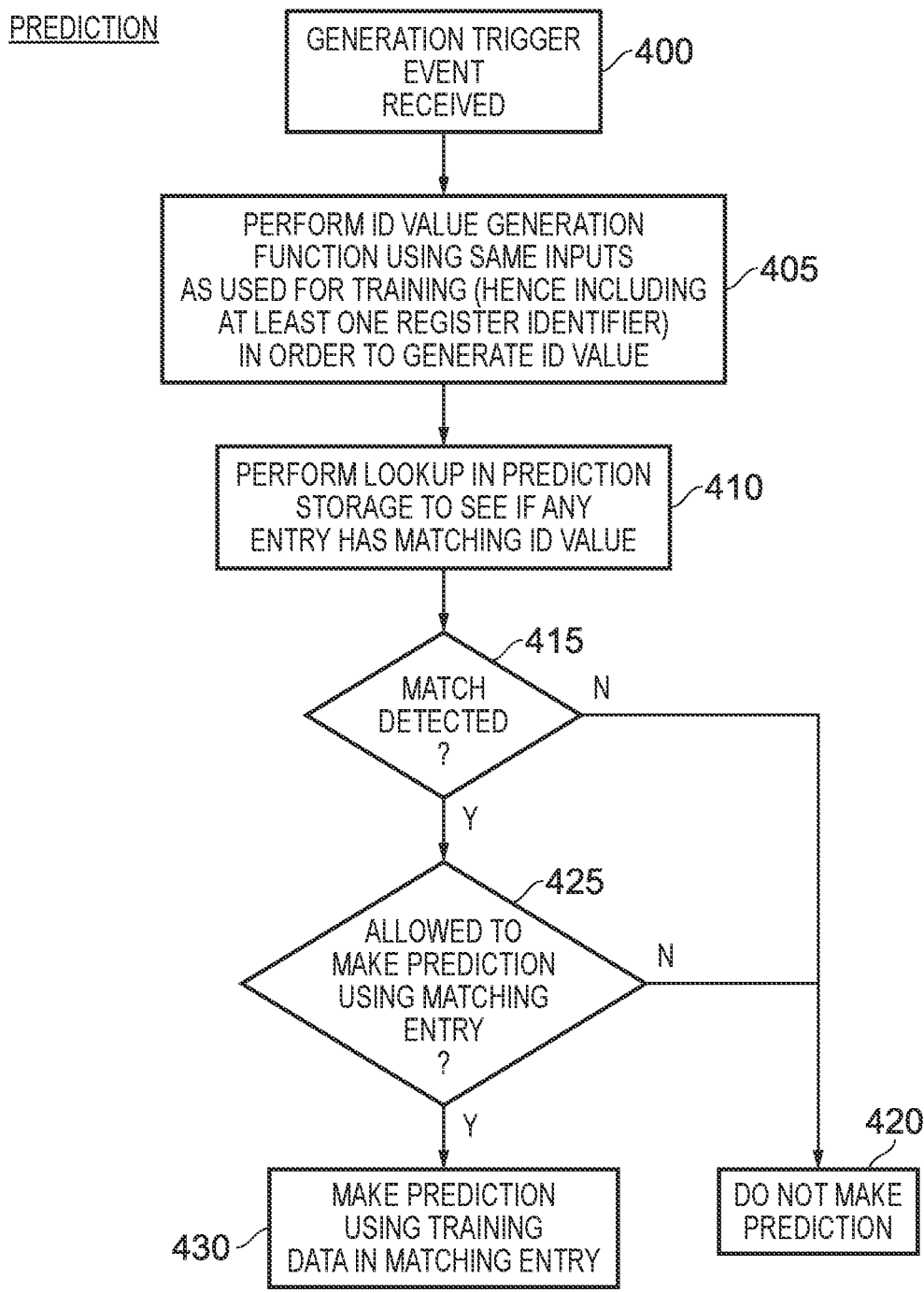
FIG. 5 is a flow diagram illustrating how predictions may be made using the apparatus of FIG. 2 in accordance with one example implementation.

FIG. 5 is a flow diagram illustrating how the prediction circuitry 140 of FIG. 2 is used to generate prediction data, in accordance with one example implementation. At step 400 a generation trigger event is received by the prediction circuitry 140. As mentioned earlier, the generation trigger events can take a variety of forms, and may or may not be correlated with training events. In one example case the same stream of events may be used for both training and generation, but in other implementations only a subset of the training events may also be considered to be generation trigger events, and in further alternative implementations the training events and generation trigger events may be entirely decoupled from each other.

Once a generation trigger event is received, then at step 405 the ID value generation function is performed by the prediction circuitry 140 using the same inputs as are used for training. As a result, the ID value generation function will use at least one register identifier that has been identified by the generation trigger event when generating the ID value.

At step 410, the prediction circuitry then performs a lookup in the prediction storage 120 to see if any entry has a matching ID value. At step 415, it is determined whether a match was detected, and if not the process proceeds to step 420 where a prediction is not made.

However, if a match is detected, then the process proceeds to step 425 where it is determined whether the system is allowed to make a prediction using the matching entry. As discussed earlier, there are a number of factors that may be considered here when deciding whether predictions should be made on the basis of the matching entry. For example, some threshold or confidence level may need to be reached in respect of the training data in the matching entry before it is used for prediction, or in the situation where active and inactive fields are used to monitor the activity of the entries, the system may preclude a prediction being made on the basis of an inactive entry. In that latter case, the presence of a match being detected may cause the entry to be transitioned from inactive to active so that it can in due course be used in the event of a subsequent generation trigger event also causing a match to be detected with that entry.

If at step 425 it is determined that a prediction should not be made using the matching entry, then the process proceeds to step 420 where no prediction is made. However, assuming it is determined that the system is allowed to make a prediction using the matching entry, the process proceeds to step 430 where the training data in the matching entry is used to make a prediction. As mentioned earlier, the number of items of prediction data generated in response to a single generation trigger event may vary, and also the timing at which items of prediction data are generated relative to the timing of receipt of the generation trigger event may vary. For instance, it may be possible that multiple items of prediction data are generated from a single trigger, for example to cause multiple lines of data to be prefetched into the cache, or multiple prefetch requests may be issued to different levels of the cache to cause cache lines of data to be loaded from memory into multiple caches. Further, with regard to the issue of timing, if an arbitration queue in a particular cache is full, it may be that the generation of the prediction data is deferred until the arbitration queue has space to receive the prefetch request including that prediction data.

The training data maintained within the entries of the prediction storage can take a wide variety of different forms, depending on the type of the prediction circuit, and the types of patterns seeking to be detected. FIG. 6 illustrates how the training data within a particular entry of the prediction storage may evolve over time, using by way of specific example a stride-based mechanism that is seeking to detect a regular stride pattern in memory accesses. As shown by the box 450, in such an example the entry within the prediction storage may include a tag field 452 to store an ID value, and fields 454 and 456 forming the pattern or training data. Optionally a confidence field 458 may also be provided to maintain a confidence indication in respect of the pattern data. The pattern/training data includes a last seen address 454 to store an indication of the most recent memory address accessed by a training event whose ID value matches the ID value in the tag field 452, and a stride value field 456 for storing a stride indication to indicate the difference between the last seen address and the immediately preceding address for a training event having the ID value in the tag field 452.

As shown by the box 455 it is assumed that an allocation is made into an entry of the prediction storage 120 for a tag value of P, in respect of an instruction/training event that accesses address B. At this point, the fields 456 and 458 are in an initialised state.

As indicated by the box 460, it is assumed that the next time a training event is detected that has a corresponding tag value of P, the instruction accesses address B+1. Accordingly, field 454 is updated to indicate the address B+1 and the stride value field 456 is populated with the value 1. At this point the confidence value is set to a logic 0 value.

It is then assumed that the next time a training event is detected that has the tag value P, the associated instruction accesses address B+2 and this causes the training entry to be updated as indicated by the box 465. In particular, the address B+2 is stored in field 454, the stride value remains set as 1, and the confidence value is incremented. At this point, in accordance with this specific example, the training entry is now considered to be trained, and can hence be subsequently used for making predictions.

In this example, it is assumed that the training events are also used as potential generation triggers, and hence the next time a training event is detected with the tag value P then if it accesses the address B+3 the training entry can be updated as indicated by the box 470. In particular, the last seen address 454 is set to the address B+3. In this example, the confidence is not incremented, since a confidence value of 1 is considered to indicate that predictions can be made. Accordingly, the system can also make a prediction based on the contents of the entry as indicated by the box 470, and hence for example may issue a prefetch request to prefetch data at address B+4. Typically an entire cache line's worth of data will be retrieved for storing within the cache in response to a prefetch request. As mentioned earlier, if desired, multiple prefetch requests can be issued to cause multiple cache lines of data to be prefetched in response to the generation trigger.

Figures 7A, 7B:
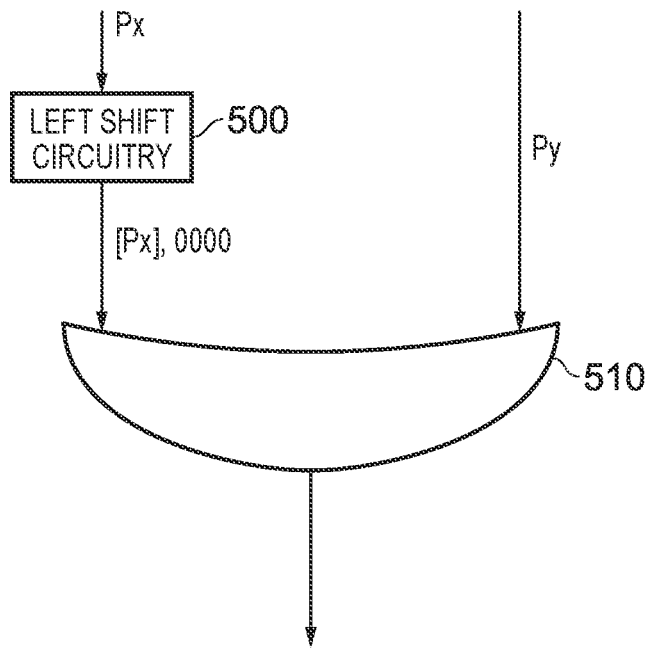
FIG. 7A schematically illustrates how an identifier value (also referred to herein as a tag value) for an entry within the prediction storage may be generated in dependence on one or more register identifiers of an instruction, in accordance with one example implementation.
FIG. 7B illustrates how the tag value may be generated from a pair of predicate register identifiers in accordance with one specific example implementation.

FIG. 7A illustrates in general terms an instruction that specifies a number of registers, and how the ID value may be generated as a function of one or more of those registers. In this particular example, the instruction has a destination register Ra, two source registers Rb and Rc, and two predicate registers Px and Py. Any suitable logical function may be specified that uses one or more of those registers, and optionally one or more other parameters specified by the training event identifying the instruction, in order to generate an ID value.

FIG. 7B illustrates a specific example function that may be used, where the ID value is based on a combination of the two predicate register identifiers. In this case, it is assumed that each predicate identifier is a 4 bit value, as in this example it is assumed that there are a total of 16 predicate registers. One example of how a function may be specified to use the predicate register identifiers is as shown in FIG. 7B, where one predicate is left shifted by the left shift circuitry 500 by 4 bits, and then passed through a OR gate function 510 which receives as its second input the unshifted second predicate. This generates an 8 bit value that is essentially a concatenation of the two predicate register identifiers, and that output can be used as the tag value.

It has been found that using predicate register identifiers in the generation of the tag value can lead to a particularly stable training of the prediction storage, making efficient use of the prediction storage resources and allowing patterns of interest to be detected even in the presence of loop unrolling, in situations where basing training on PC value can be less effective.

Figure 7C:
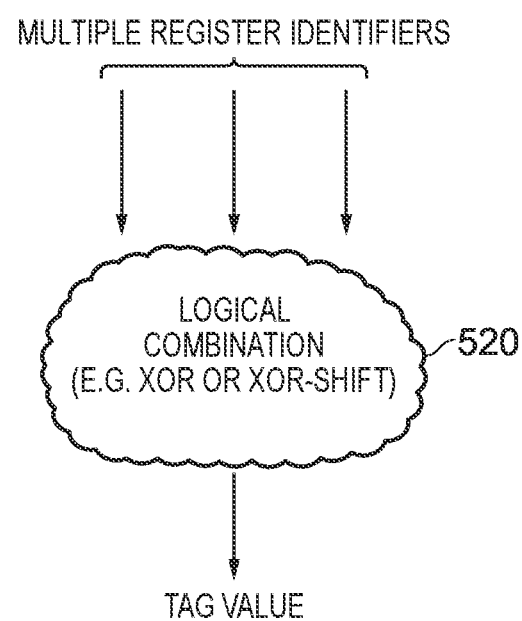
FIG. 7C illustrates how any suitable logical combination can be performed in respect of multiple register identifiers in order to generate a tag value in accordance with one example implementation.

However, in more general terms, as indicated in FIG. 7C, any logical combination 520 of various register identifiers can be used in order to generate the tag value. Purely for the purposes of illustration, three example functions are set out below:

Example 1:
Tag=F(Ra, . . . , Rn), where F=a xor b xor . . . xor z
Example 2:
Tag=F(Ra, . . . , Rz), where F=( . . . (a xor b)<<1 xor . . . xor z)<<1)
Position of the register makes a difference
Example 3:
Tag=F(Rw, Rp1, Rr1, Rp2, Rr2), where Rw—destination register, Rrx—source registers, Rpx—predicate registers and F is computed as follows:

```
F(Rw, Rp1, Rr1, Rp2, Rr2)
{
   if (destination register used)
       return 1
   else
   {
      if (first source register is predicate)
          return second_source_register_number + 2
      else
          return 0
   }
}
```

Example 1 shows an XOR function where various register identifiers, or information derived therefrom, are subjected to an XOR operation in order to produce the tag value. In this example the register numbers are used directly as the inputs and hence, by way of example, if an instruction accesses registers X5, X6 and X7, the resultant tag will be produced by the computation 5 XOR 6 XOR 7. However, in other implementations other register information could be used. For instance, information relating to the type of register(s) could be used. For example, if register types are used, an instruction accessing registers {X7, P3, Z16} is considered, and it is determined that X registers get value 1 for tag computation, P registers get value 2 and Z registers get value 3, then the tag value will be computed as 1 XOR 2 XOR 3 and in this case any instruction accessing {Xi, Pj, Zk} will get the same tag value.

Example 2 shows a slight variant where each intermediate result is shifted left by one before another register is taken into account. In contrast to example 1, when using example 2 this can ensure that the position of the register identifier within the instruction will influence the tag value, and hence can distinguish between situations where a particular register is used as a source register or is used as a destination register, for example. As discussed earlier, various approaches can be adopted when performing an XOR-shift function so as to influence the total number of bits in the resultant tag value. Depending on the exact need and calculations, this may result in the generation of a tag value with more bits than in the individual register information used as inputs. Generally speaking the tag size has no dependency on the information size of the information used as inputs. In practice smaller tags may be preferred to larger tags in some instances due to the reduction in cost of the associated logic that can be achieved (larger tags will require transport of more bits and may result in an increase in power consumption). However, larger tags may be preferred if they result in better performance as truncating to smaller values may result in undesirable clashes (in much the same way as hash function clashes).

Whilst example 2 shows one form of XOR-shift function that can be used, it will be appreciated that other forms of XOR-shift could instead be used. As one example, the following approach could be used:
Loop though all registers:
Tag=0
For each Ri
   Tag=Tag<<1
   Tag=Tag XOR i
This produces a slightly different result to example 2 above, namely:
Tag=F(Ra, . . . , Rz), where F=( . . . ((a<<1) xor b)<<1) xor . . . xor z)<<1)

As a further alternative approach, every register number could be shifted before it is subjected to the XOR operation, as illustrated below:
Tag=0
j=0//position of the register in the access order
For each Ri//i=register information
   Y=i<<j//register information is shifted left as many bits as its order
   Tag=Tag XOR Y
   j++
When adopting the above approach the result will then be:
Tag=F(Ra, . . . , Rz), where F=(a<<0) xor (b<<1) xor (c<<2) . . . xor (z<<25)

Example 3 shows, purely for the sake of illustration, an alternative function that could be used. This function seeks to distinguish between stores and loads. In particular, if a destination register is used, then the instruction is a store instruction, and in this example a value of one is returned as the tag value for all store instructions. However, the "else" functionality then determines how to set the tag value for loads. In this particular example, the loads of interest are those that use a predicate value, and hence if they do not use a predicate value the tag value of 0 is returned. However, in the event of a load instruction that uses a predicate, then a tag value is returned that is dependent on the second source register number specified. In this example, the second source register number is incremented by 2 to ensure that there can be no conflict with tag values of 0 or 1 (as mentioned earlier these tag values being used for load instructions that do not use a predicate or for store instructions, respectively).

Whilst the techniques described herein can generate tag values based on any logical combination of registers specified by an instruction, and indeed combine that information with other parameters if desired, in one example use case it has been found that very effective training can be achieved by using predicate register identifiers in the generation of the ID value. Predicate register values are used in a wide variety of data processing operations, in particular vector processing operations where it may be desirable to specify whether the identified operation is to be performed on a lane by lane basis. More generally, when specifying a vector of operands, predicate information can be used to identify which elements within the vector are to be processed.

Figure 8:
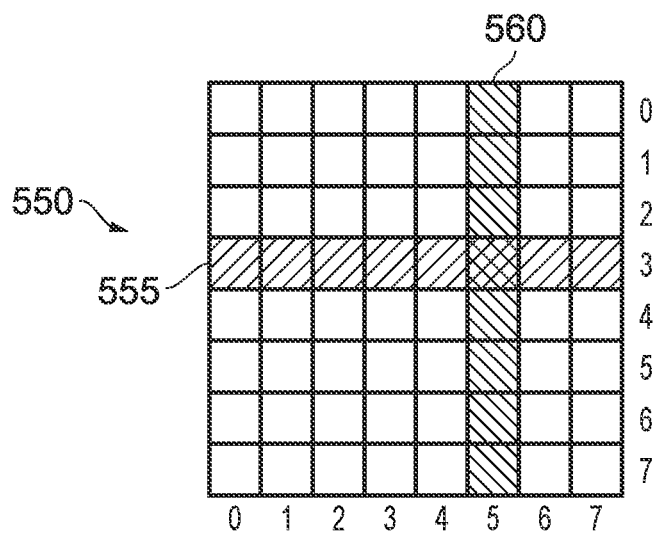
FIG. 8 schematically illustrates a matrix processing example where two predicate registers may be used.

A particular example form of vector processing that uses two predicate values is matrix processing, as illustrated schematically in FIG. 8. In particular, a data processing apparatus may be provided with matrix processing circuitry that can be controlled to perform matrix processing in response to matrix arithmetic program instructions. The format of such an instruction is shown in the top part of FIG. 8 for the example of a load instruction. A row/column selection parameter can be explicitly encoded in the load instruction, using a field within the instruction encoding which selects whether a row group 555 or a column group 560 of a matrix transpose box 550 is loaded with data from memory. Alternatively, the row/column selection parameter could be implicitly encoded.

As also shown in FIG. 8, the load instruction may include a row/column ID directly as an immediate parameter, or indirectly by specifying a register which contains the row/column ID. When loading data from a matrix data structure in memory, the circuitry may select (in response to the row/column selection parameter) whether to load an individual row group 555 or an individual column group 560 of the transpose box 550 with data from a portion of the matrix structure in memory selected based on the addressing information provided within the load instruction. That addressing information could for example be stored within general purpose registers which are used for general integer operands, or in other examples could be stored within some dedicated matrix addressing information registers.

As also shown in FIG. 8, the load instruction may specify two pieces of masking state information, referred to as mask 1 and mask 2, and these may be specified in predicate registers. The first masking state information (mask 1) is used to control masking of certain row/column positions to prevent the corresponding row/column group of the matrix transpose box 550 being updated based on the corresponding values in memory. For each row/column position in the matrix transpose box 550, the first masking state information identifies whether that row/column position is a masked row/column position or an unmasked row/column position. That is, if the row/column selection parameter specified in the instruction indicates that elements are to be written in rows, the masking indications of the first masking state information correspond to different row positions. If instead the row/column selection parameter indicates that the elements are to be written to the matrix transpose box 550 in columns, then the masking indications of the first masking state information correspond to different column positions.

If the first masking state information specifies that the target row/column to be loaded is an unmasked row/column, then the second masking state information (mask 2) can be used to identify which individual element positions within the target row/column are masked, and the matrix load circuitry then obtains the corresponding data from the matrix structure stored in memory and writes the non-masked elements of the target row/column to the corresponding elements of the selected row/column group of the matrix transpose box 550 (in one example implementation with any masked out elements in the selected row/column group being set to a masking value instead).

Hence, in effect mask 1 can be used to identify whether a load to the target row/column is required at all, and if it is mask 2 can then be used to identify the individual elements to be loaded.

It has been found that with this type of computation, even when significant levels of loop unrolling are performed in order to take advantage of parallelisation, the relevant load instructions often all use the same predicate register information, and hence basing the generation of the tag value on at least the predicate register information can provide for a highly effective training of the prefetch circuitry.

For more information on matrix processing operations using instructions of the type shown in FIG. 8, the reader is referred to commonly owned, co-pending, UK patent application 2007068.6, the entire contents of which are hereby incorporated by reference.

Figure 9B:
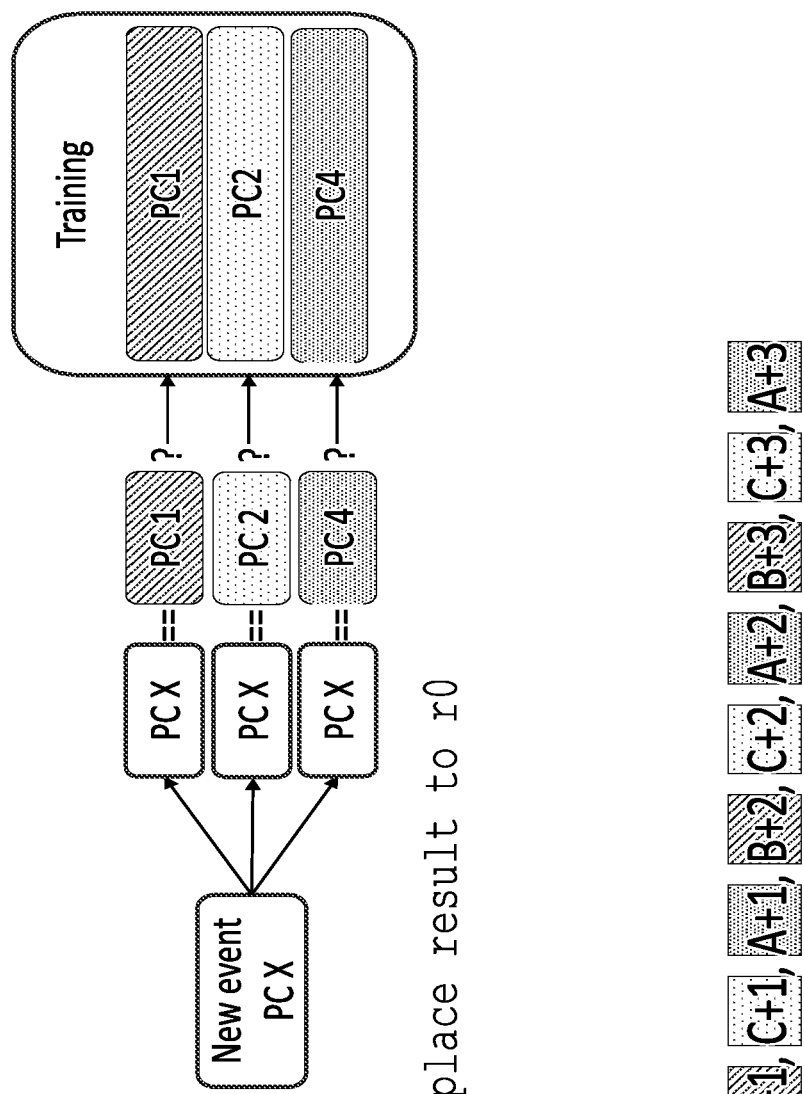

FIGS. 9A to 9D illustrate tagging schemes that do not incorporate the techniques described herein. In particular, FIG. 9A illustrates a simple loop comprising two load instructions and a store instruction. The streams of accesses associated with those different load and store instructions are shown at the bottom of FIG. 9A, and as can be seen the first load instruction loads from addresses B, B+1, B+2, etc., the second load instruction loads from addresses C, C+1, C+2, etc., and the store instruction stores to addresses A, A+1, A+2, etc.

As shown in FIG. 9B, in the absence of loop unrolling use of the program counter value when generating the tags for the prediction storage can be highly effective, since only three entries are required within the prediction storage, and each training event can be correctly matched to the relevant entries based on PC value.

However, FIG. 9C illustrates essentially the same code, but with loop unrolling having been performed, so that the processing that would have been performed via two loops in the original code is now performed by a single loop. At the bottom of FIG. 9C the associated patterns of accesses that would be tracked if training entries were based on PC values is shown. As can be seen, each of the load patterns that would have been detected by a single entry in FIG. 9B are now detected across two entries in the prediction storage, each of which detects strides of 2 rather than strides of 1. A similar situation arises for the store instructions. Hence, in the presence of loop unrolling, this can lead to significantly less efficient usage of the prediction resources within the prediction storage, can take longer for individual entries to train, and can lead to a less performant solution.

Figure 9D:
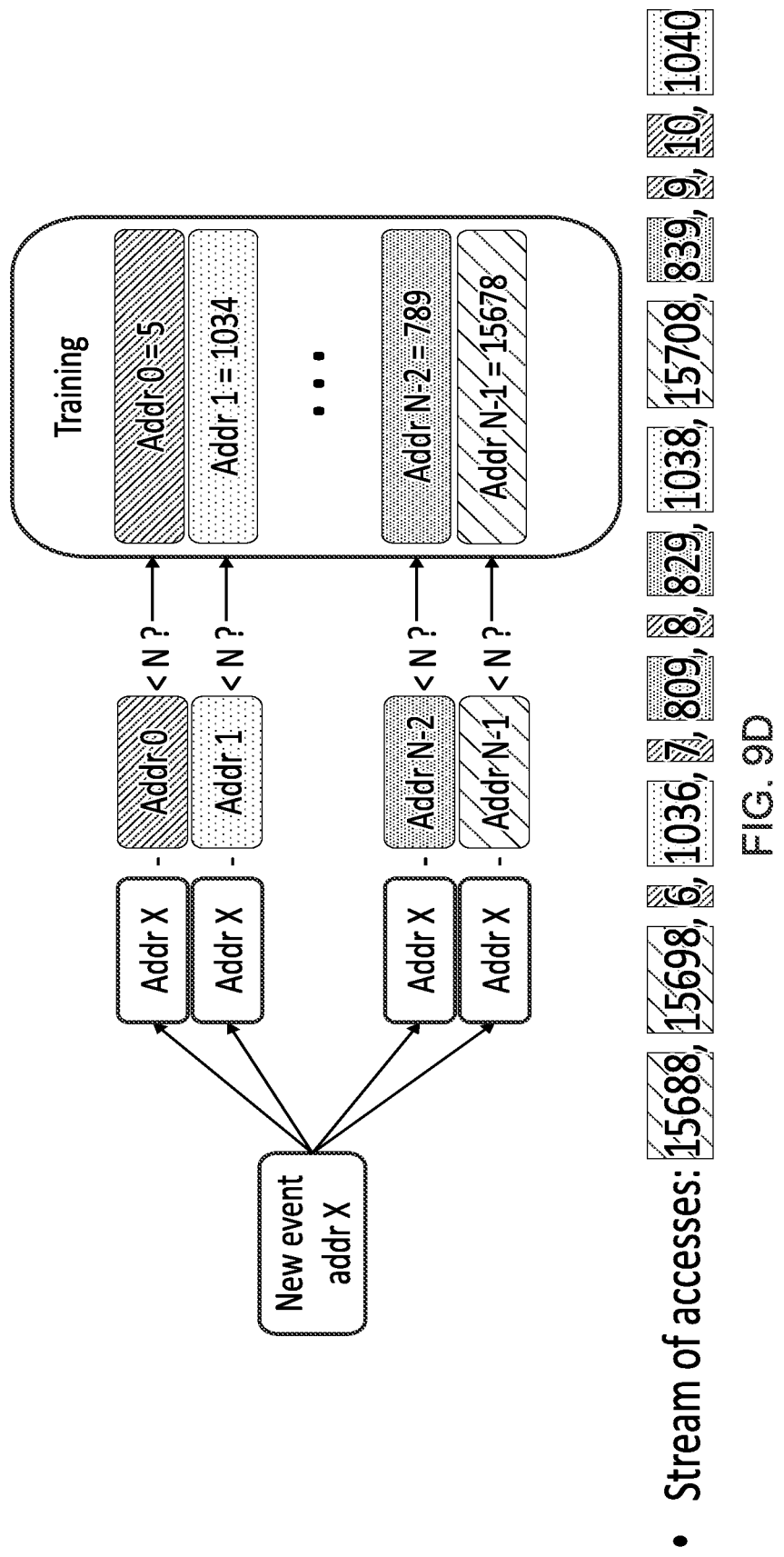

FIG. 9D illustrates the earlier mentioned address distance base scheme, where as each new training event is received, the memory address being accessed is determined and it is determined how close that address is to address values stored as tags within the training entries. In particular, it is determined whether the address is within a certain range of the tag address used in the training entries, and if so that training event is considered to be part of that training stream. Such an approach can be more tolerant to loop unrolling, but it can be problematic determining the appropriate addresses and address ranges to use in order to result in effective training.

Figure 10:
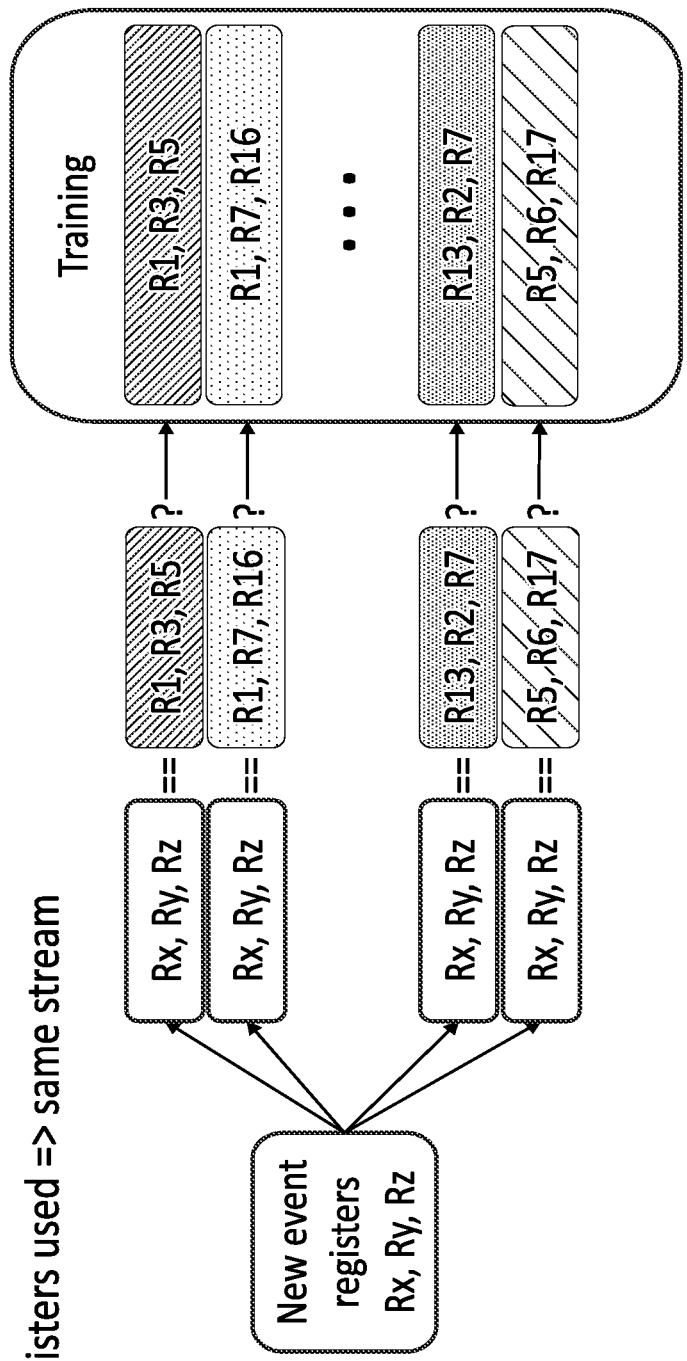
FIG. 10 illustrates a tagging scheme in accordance with the techniques described herein, where logical combinations of one or more register identifiers are used in order to generate the tag values.

FIG. 10 schematically illustrates the tagging technique used in one example implementation. In particular, one or more architectural registers are used as information for tagging, and the architectural registers may be general purpose registers or predicate registers as discussed earlier. As each load or store instruction uses a set of architectural registers to perform its operations, then by generating a tag value based on some logical combination of one or more of those architectural registers, it has been found that this can provide a highly accurate mechanism for allocating training events to the correct streams, hence allowing for a very stable training, and an efficient use of the prediction storage resources. This in turn results in a more performant prediction unit.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   an input interface to receive a sequence of training events indicative of program instructions;
   identifier value generation circuitry to perform an identifier value generation function to generate, for a given training event received at the input interface, an identifier value for that given training event, wherein the identifier value generation function is arranged such that the generated identifier value is generated from at least one register referenced by a program instruction indicated by that given training event;

prediction storage having a plurality of training entries, wherein each training entry is allocated an identifier value as generated by the identifier value generation function, and is used to maintain training data derived from training events having that allocated identifier value; and matching circuitry, responsive to the given training event, to detect whether the prediction storage has a matching training entry whose allocated identifier value matches the identifier value for the given training event, and in that event to cause the training data in the matching training entry to be updated in dependence on the given training event.

2. An apparatus as claimed in claim 1, further comprising:
prediction circuitry, responsive to a determination that the training data within a given training entry satisfies a prediction generation condition, to treat the given training entry as a trained entry and to use the training data in that trained entry to generate prediction data.

3. An apparatus as claimed in claim 2, wherein the prediction circuitry is arranged, responsive to a generation trigger event identifying at least one register, to perform the identifier value generation function to generate the identifier value for that generation trigger event, and to detect whether the prediction storage has a matching trained entry whose allocated identifier value matches the identifier value for the generation trigger event, the prediction circuitry being further arranged to generate one or more items of prediction data in dependence on the training data in the matching trained entry.

4. An apparatus as claimed in claim 1, wherein the identifier value generation function is a function using as input solely one or more register identifiers.

5. An apparatus as claimed in claim 1, wherein the identifier value generation function is a function using as input one or more register identifiers and at least one further input parameter.

6. An apparatus as claimed in claim 5, wherein the at least one further input parameter comprises a program counter parameter derived from a program counter value of the associated program instruction.

7. An apparatus as claimed in claim 5, wherein the at least one further input parameter comprises a memory address parameter indicative of a memory address to be accessed when executing the associated program instruction.

8. An apparatus as claimed in claim 1, wherein:
the identifier value generation function is a function using, as input, register identifiers of multiple registers used by the associated program instruction; and
the identifier value generation function is arranged to perform a logical combination of the register identifiers when generating the identifier value.

9. An apparatus as claimed in claim 1, wherein the identifier value generation function is a function using as input one or more register identifiers of predicate registers used by the associated program instruction.

10. An apparatus as claimed in claim 9, wherein the identifier value generation function is a function using as input the register identifiers of multiple predicate registers, and is arranged to generate the identifier value by concatenating together identifying information of each predicate register.

11. An apparatus as claimed in claim 1, wherein the identifier value generation function is a function using as input one or more architectural register identifiers specified by the associated program instruction.

12. An apparatus as claimed in claim 2, wherein:
the training events in the sequence are indicative of memory access program instructions used to access data in memory;
the apparatus further comprises cache storage to cache a subset of the data stored in the memory; and
the prediction circuitry comprises prefetch circuitry to generate, as the prediction data, an indication of one of more predicted memory addresses predicted to be accessed in future by processing circuitry that is executing the memory access program instructions, to thereby enable the data at those one of more predicted memory addresses to be prefetched into the cache storage.

13. An apparatus as claimed in claim 2, wherein the training data in each training entry comprises an indication of a pattern derived from previous occurrences of training events having the allocated identifier value for that training entry, and the prediction circuitry is arranged to determine the prediction data from the pattern identified in the training entry.

14. An apparatus as claimed in claim 2, wherein each training entry has a generation condition field whose value is used to identify whether the prediction generation condition is satisfied.

15. An apparatus as claimed in claim 1, further comprising:
allocation circuitry, responsive to the matching circuitry determining that the prediction storage has no matching training entry for the given training event, to apply determined criteria to determine whether to allocate one of the training entries to maintain training data for the identifier value of that given training event.

16. A method of training a prediction apparatus, comprising:
receiving a sequence of training events indicative of program instructions;
performing an identifier value generation function to generate, for a given training event received, an identifier value for that given training event, wherein the identifier value generation function is arranged such that the generated identifier value is generated from at least one register referenced by a program instruction indicated by that given training event;
maintaining within prediction storage a plurality of training entries, wherein each training entry is allocated an identifier value as generated by the identifier value generation function, and is used to maintain training data derived from training events having that allocated identifier value; and
responsive to the given training event, detecting whether the prediction storage has a matching training entry whose allocated identifier value matches the identifier value for the given training event, and in that event to cause the training data in the matching training entry to be updated in dependence on the given training event.

* * * * *